United States Patent [19]
Taylor

[11] Patent Number: 5,758,131
[45] Date of Patent: May 26, 1998

[54] BUS ADAPTER FOR SYNCHRONIZING COMMUNICATIONS BETWEEN TWO CIRCUITS RUNNING AT DIFFERENT CLOCK RATES

[75] Inventor: Gary L. Taylor, Windsor, Colo.

[73] Assignee: Hewlett-Packard Company, Palo Alto, Calif.

[21] Appl. No.: 712,001

[22] Filed: Sep. 11, 1996

[51] Int. Cl.⁶ .................................................. G06F 1/04
[52] U.S. Cl. ............................ 395/552; 395/558; 395/559
[58] Field of Search .................................. 395/551, 552, 395/558, 559, 309

[56] References Cited

U.S. PATENT DOCUMENTS

| | | | |
|---|---|---|---|
| 5,448,715 | 9/1995 | Lelm et al. | 395/550 |
| 5,471,587 | 11/1995 | Fernando | 395/309 |
| 5,600,824 | 2/1997 | Williams et al. | 395/551 |

*Primary Examiner*—Dennis M. Butler

[57] ABSTRACT

A circuit and method for transferring data between a first domain operating synchronously with respect to a first clock having a frequency $C_1$ and a second domain operating synchronously with respect to a second clock having a frequency $C_2$. The ratio of the clock frequencies is equal to the ratio of two integers. The data is to be transferred from a latch in the first domain to a latch in the second domain having setup and hold requirements to prevent race conditions. The circuit includes a plurality of data paths, each data path providing a different delay, the delays being quantized in units of $1/(2C_1)$. The circuit also defines a first clock cycle in which the first clock has a predetermined relationship with respect to the second clock. The circuit selects one the plurality of data paths depending on a relationship between the first clock and the defined clock cycle. The path is selected such that the transferred data arrives at the latch in the second domain with the minimum delay consistent with the setup and hold requirements of the latch in the second domain. The circuit may also include a FIFO buffer. In this case, data stored in the FIFO is delivered to the second domain via one of a plurality of paths, each the path having a different delay, the delays being quantized in units of $1/(2C_1)$.

8 Claims, 3 Drawing Sheets

BUS ADAPTER FOR SYNCHRONIZING COMMUNICATIONS BETWEEN TWO CIRCUITS RUNNING AT DIFFERENT CLOCK RATES

FIELD OF THE INVENTION

The present invention relates to electronic circuits constructed from a plurality of chips or circuit blocks connected to a bus, and more particularly, to an improved circuit method of synchronizing the chips to the bus clock.

BACKGROUND OF THE INVENTION

Many electronic systems such as computers are constructed from a plurality of chips that are interfaced to a synchronous bus. The transfer of data between the various chips and the bus is synchronized with a bus clock whose maximum speed is determined by the electrical characteristics of the bus.

In many cases, the chips connected to the bus are capable of running at significantly higher clock speeds than the bus can support. The internal speed of a chip is limited by the length of conductors in the chip and by the various parasitic capacitances in the chip. Since signal propagation distances in a chip are much smaller than the signal propagation distances on the bus, chips can often run at much higher speeds than the bus. If the chips do not need to transfer data to or from the bus on each CPU cycle, a significant speed advantage may be obtained by running the chips at a clock speed that exceeds the bus clock.

Computer systems in which the microprocessor chip runs at an integer multiple of the bus speed are known to the prior art. For example, systems in which the microprocessor operates at a clock speed that is twice or four times the bus speed are commercially available. Since a microprocessor may require several internal clock cycles to execute an instruction, running the microprocessor at a higher speed than the bus clock results in a significant reduction in the execution time of such instructions.

The operation of the CPU at speeds considerably higher than the bus on which the CPU receives information has created an interfacing problem. To maximize the efficiency of both the CPU and the memory bus, the interface must accommodate an arbitrary ratio between the clock frequencies in the two domains. In addition, the interface between the two domains must accommodate significant clock skew and delays so that the two domains can be separately optimized. Finally, any delay in the data arriving at the CPU or leaving the CPU must be minimized.

One prior art method for constructing an interface between two domains operating at different clock frequencies is to use a FIFO for buffering the data. The FIFO has completely separate input and output interfaces that operate asynchronously. This solution requires a "synchronizer" circuit to transfer control information from the FIFO input port to the output port across the frequency barrier. Unfortunately, the sychronizer circuit must settle, and hence, a delay is introduced between the input and output ports of the FIFO. The synchronizer circuit in these systems is a regenerative latch designed to resolve an intermediate input value into an unambiguous logical 1 or 0. Such intermediate input values result from a value being received at the wrong time. That is, the input value will have transitioned half way when the clock edge arrives. This delay in the control information results in a delay through the FIFO.

A second prior art solution removes this delay by restricting the range of clock ratios between the two domains. In this system, all clock transitions in the slower domain occur on a clock transition in the faster domain. In the most complex versions of these prior art schemes, the clock frequencies can be in the ratio of 2/n where n is an integer greater than 1. In these schemes, the data is again buffered by a FIFO buffer. However the control information can now be passed directly between the two clock domains using techniques that do not introduce time delays. The flow of data from the input to the output of the FIFO is only limited by the combinational logic delays in the data path. While these schemes remove the delays inherent in the asynchronous approach, the available clock ratio spacings are still too coarse for many applications.

Broadly, it is the object of the present invention to provide an improved method for synchronizing data transfer between domains operating at different clock frequencies.

It is a further object of the present invention to provide an interface system that allows the domains to operate at more finely spaced frequency ratios than available in prior art solutions without introducing the data delays encountered in asynchronous interface circuits.

These and other objects of the present invention will become apparent to those skilled in the art from the following detailed description of the invention and the accompanying drawings.

SUMMARY OF THE INVENTION

The present invention is a circuit and method for transferring data between a first domain operating synchronously with respect to a first clock having a frequency $C_1$ and a second domain operating synchronously with respect to a second clock having a frequency $C_2$. The ratio of the clock frequencies is equal to the ratio of two positive integers. The data is to be transferred from a latch in the first domain to a latch in the second domain having setup and hold requirements to prevent race conditions. The circuit includes a plurality of data paths, each data path providing a different delay, the delays being quantized in units of $1/(2C_1)$. The circuit also defines a first clock cycle in which the first clock has a predetermined relationship with respect to the second clock. The circuit selects one the plurality of data paths depending on the relationship between the first clock and the defined clock cycle. The path is selected such that the transferred data arrives at the latch in the second domain with the minimum delay consistent with the setup and hold requirements of the latch in the second domain. The circuit may also include a FIFO buffer. In this case, data stored in the FIFO is delivered to the second domain via one of a plurality of paths, each the path having a different delay, the delays being quantized in units of $1/(2C_1)$.

DETAILED DESCRIPTION OF THE INVENTION

The present invention provides an interface between a fast domain running under a first clock and a slow domain running under a second clock. The clock frequencies are in the ratio of F:S where F and S are positive integers and F>S. Since the clocks have frequencies that are related by an integer ratio, there will be one clock cycle out of F cycles in the fast domain at which the fast clock and slow clock will have coincident edges in the absence of clock skew.

Figure 1:
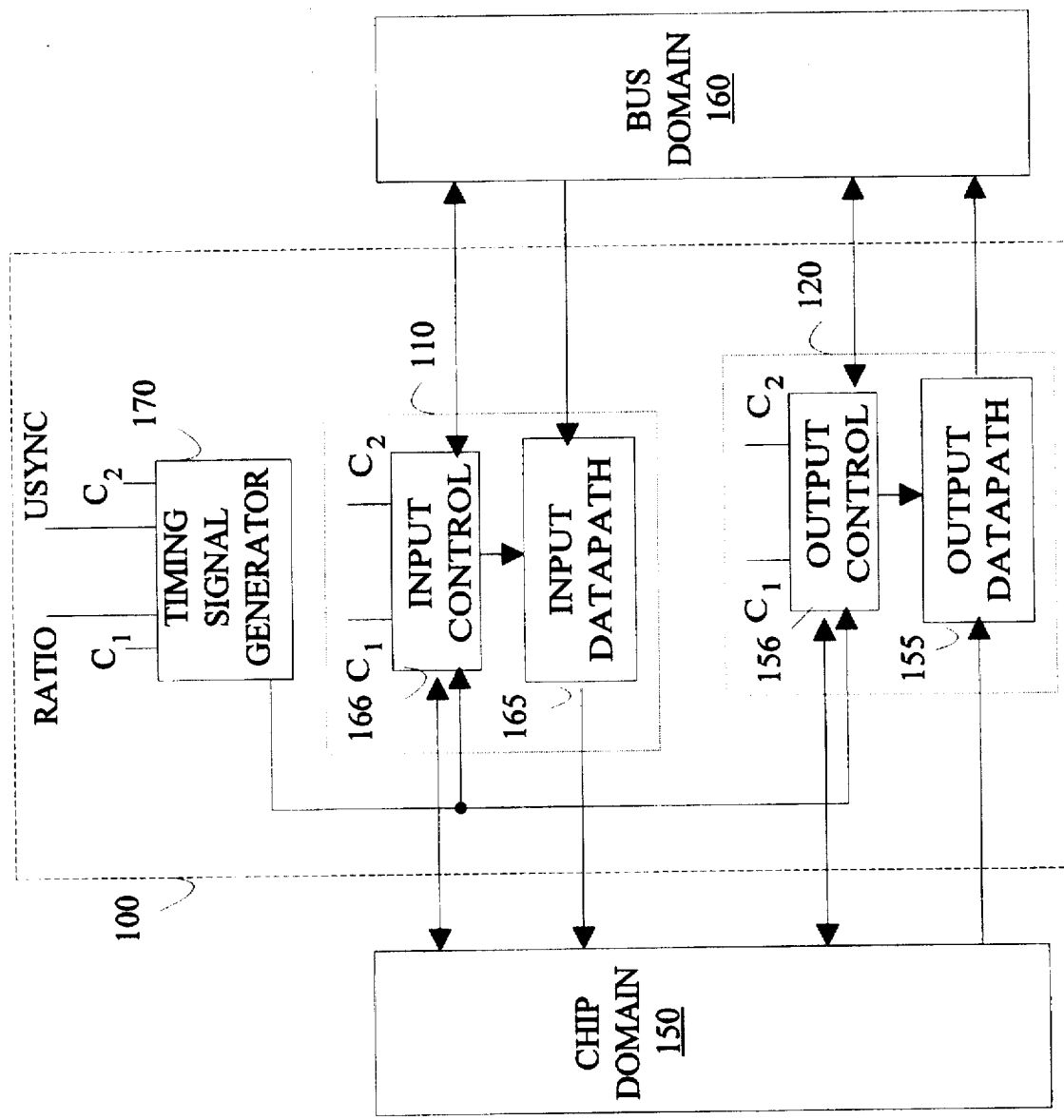
FIG. 1 is a block diagram of an interface circuit utilizing two data paths according to the present invention operating between a chip domain and a slower bus domain.

Refer now to FIG. 1 which is a block diagram of an interface circuit 100 according to the present invention operating between a chip domain 150 and a slower bus domain 160. Interface circuit 100 provides a slow interface 110 for transferring data from bus domain 160 to the chip domain. In addition interface 100 provides a fast interface 120 for transferring data from the chip domain 150 to the bus domain 160.

Each of the interface circuit comprises a control signal generator and a data path. The fast data path preferably includes a FIFO buffer, since the chip domain can generate data faster than the bus domain can absorb the data. For the purposes of this discussion, the interface circuits are viewed from the perspective of the chip domain. Hence, a circuit providing data to the chip domain is referred to as an input circuit, and a circuit for outputting data from the chip domain is referred to as an output circuit. Output data path 155 is controlled by output control circuit 156. Input data path 165 is controlled by input control circuit 166.

The input and output control circuits utilize a set of timing control signals that are generated from the two clocks, a signal specifying the clock ratio, and a signal (USYNC) specifying the clock cycle on which the fast and slow clocks have coincident rising edges. The clock ratio signal in the preferred embodiment of the present invention comprises a multi-bit signal specifying the allowed clock ratio's from the list of clock ratio for which the circuit was designed. These control signals are generated by timing signal generator 170. Output control circuit 156 also utilizes the two clock signals, $C_1$ and $C_2$, directly. The clock signals are used directly to assure that any timing inaccuracies in the timing control signals are corrected by ANDing the control signals with the clock signals.

Each of the data paths is constructed from a plurality of data paths having different delays. The path chosen depends on the clock states. Each data path delivers data input from one domain to a latch which is part of the other domain. The data path may contain a FIFO buffer for storing data in transit. If data is stored in the FIFO, the oldest data in the FIFO is delivered to the latch on the next clock cycle in the latch's domain. If the FIFO is empty, the path is selected such that the input data will be delivered to the latch on the next clock cycle in the latch's domain that is consistent with setup and hold requirements of the latch and any skew with respect to the clocks. As used herein, the "setup time" of a latch is the time prior to the clock edge at which the data will be read needed to assure that the data will be properly latched. The "hold time" for a latch is the time interval over which the data must be present to assure that it is properly latched. Hold time constraints must be met to assure that race conditions do not occur. In particular, a bit of data received from the chip domain on the clock cycle at which the clocks have logically coincident rising edges is delivered to the latch in the bus domain without delay. The term "logically coincident rising edges" is used herein to emphasize that the present invention will operate satisfactorily even if the clock edges are skewed with respect to one another, provided the skew the maximum skew is known in advance and taken into account in the path delays. In general, the skew in the clocks are equivalent to circuit delays in the following discussion. The skews plus the circuit delays are additive and reduce the hold and setup margins of the final latch. Within these margins, the present invention will operate even with clock skew.

Figure 2:
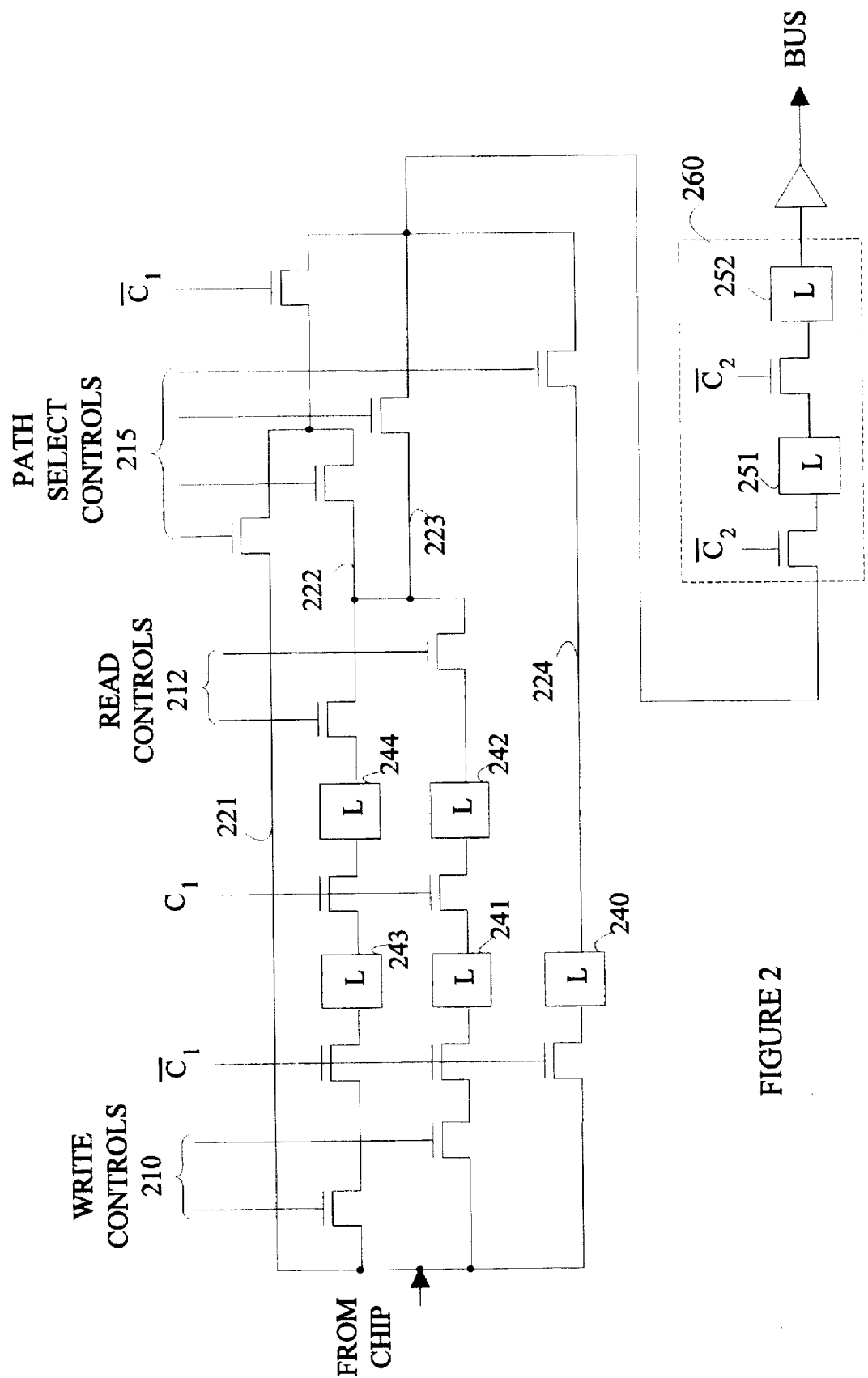
FIG. 2 is a schematic drawing of a fast data path according to the present invention.

Refer now to FIG. 2 which is a schematic drawing of a fast data path 200 for providing data to an output buffer 260 comprising latches 251 and 252. Data path 200 has four paths shown at 221-224 which provide different delays and a two cell FIFO buffer. Three of the paths include latches. The first FIFO cell includes latches 243 and 244, and the second FIFO cell includes latches 241 and 242. Data is written into the FIFO paths in response to write control signals 210. Data is read out of the FIFO paths in response to Read control signals 212. It should be noted that the output of each of the FIFO cells is connected to the output buffer by two different paths, 222 and 223. The path selected depends on the clock cycles and is chosen to deliver the FIFO data to the output buffer with the minimum delay consistent with the setup and hold requirements of output buffer 260.

Data path 200 includes paths that provide delays in increments of half clock cycles in the fast domain, i.e., half clock cycles with respect to $C_1$. Path 221, has no delay other than the transit time through the three transistors. Path 224 has a delay of one half of a clock cycle. Paths 222 and 223 provide delays of one clock cycle and above. The path that is connected to the output buffer is specified by path select control signals 215.

If no data is currently stored in the FIFO when a new bit arrives from the chip, the bit is routed via a path that has a delay of 0, 0.5, or 1 clock cycle in the fast domain. The path chosen depends on the clock cycle on which the bit was received, i.e., the clock cycle relative to the cycle in which the fast and slow domains have coincident clock edges. The data is delivered such that it will be available to the bus on the next clock slow clock cycle but will not arrive with insufficient delay to cause a race condition with respect to the output buffer.

As noted above, the present invention allows for a significant amount of skew in the clock signals. The setup hold constraint is only an issue if the clock in the chip domain is skewed such that it arrives late. The hold constraint is only a problem if the clock in the chip domain is skewed such that it arrives early. The setup constraint will be satisfied if $\overline{C}_1$ AND $\overline{C}_2$ is sufficiently wide. The hold constraint is provided by the latch in the chip domain that contains the data. The hold constraint is met if the latch in the chip domain providing the data holds the data until $\overline{C}_1$ falls. This may occur before or after $\overline{C}_2$ falls.

Figure 3:
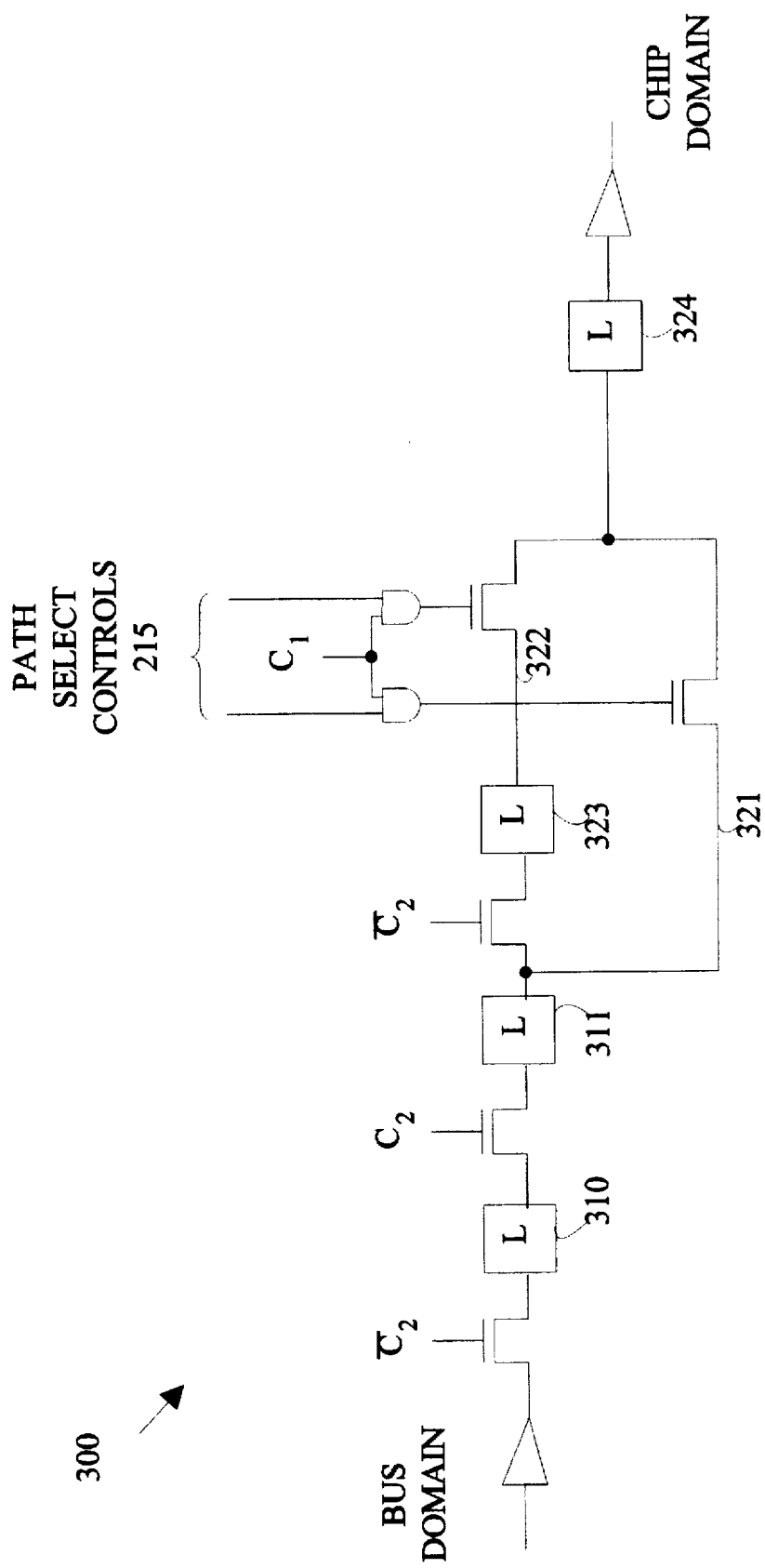
FIG. 3 is a schematic drawing of the preferred embodiment of an slow data path according to the present invention.

FIG. 3 is a schematic drawing of the preferred embodiment of an input path 300 according to the present invention. The input data path is much simpler than the output data path since the fast domain can absorb data faster than the slow domain can provide the data. The input data path includes a buffer comprising latches 310 and 311 for storing a bit to be transferred to the fast domain. The output of the buffer is transferred to the input latch 324 in the chip domain via either path 321 or path 322. These paths differ in delays by one half of a clock cycle in the slow domain. The path taken depends on the clock cycle and selected by path select controls 315. It should be noted that the path select controls are ANDed with the fast clock to assure that the data is transferred on a fast clock edge.

Various modifications to the present invention will become apparent to those skilled in the art from the foregoing description and accompanying drawings. Accordingly, the present invention is to be limited solely by the scope of the following claims.

What is claimed is:

1. A circuit for transferring data between a first domain operating synchronously with respect to a first clock having a frequency $C_1$ and a second domain operating synchronously with respect to a second clock having a frequency $C_2$, wherein the ratio of the clock frequencies is equal to the ratio of two integers, said data being transferred from a latch in said first domain to a latch in said second domain having setup and hold requirements to prevent race conditions, said circuit comprising:

a plurality of data paths, each of said data path providing a different delay;

means for defining a first clock cycle in which said first clock has a predetermined relationship with respect to said second clock; and means for selecting one of said plurality of data paths depending on a relationship between said second clock and said defined clock cycle, said path being selected such that said transferred data arrives at said latch in said second domain with the minimum delay consistent with said setup and hold requirements of said latch in said second domain.

2. The circuit of claim 1 wherein said plurality of data paths comprises a FIFO buffer, and wherein data stored in said FIFO is delivered to said second domain via one of a plurality of paths, each said path having a different delay.

3. The circuit of claim 2 wherein one of said plurality of paths comprises at least one storage cell of said FIFO buffer.

4. The circuit of claim 1 wherein said selecting means comprises means for generating a control signal having a rising or a falling edge coincident with an edge of said first clock or said second clock.

5. A method for transferring data between a first domain operating synchronously with respect to a first clock having a frequency $C_1$ and a second domain operating synchronously with respect to a second clock having a frequency $C_2$, where the ratio of the clock frequencies is equal to the ratio of two integers, said data being transferred from a latch in said first domain to a latch in said second domain having setup and hold requirements to prevent race conditions, said method comprising the steps of:

providing a plurality of data paths, each said data path providing a different delay, said delays being quantized in units of $1/(2C_1)$;

defining a first clock cycle in which said first clock has a predetermined relationship with respect to said second clock; and selecting one said plurality of data paths depending on the relationship of said second clock to said defined clock cycle, said path being select such that said transferred data arrives at said latch in said second domain with the minimum delay consistent with said setup and hold requirements of said latch in said second domain.

6. The method of claim 5 wherein said plurality of data paths comprises a FIFO buffer, and wherein data stored in said FIFO is delivered to said second domain via one of a plurality of paths, each said path having a different delay, said delays being quantized in units of $1/(2C_1)$.

7. The method of claim 6 wherein one of said plurality of paths comprises at least one storage cell of said FIFO buffer.

8. The method of claim 5 wherein said selecting means comprises means for generating a control signal having a clock edges coincident with the edges of said first clock.

* * * * *

UNITED STATES PATENT AND TRADEMARK OFFICE
CERTIFICATE OF CORRECTION

PATENT NO.   : 5,758,131
DATED        : May 26, 1998
INVENTOR(S)  : Gary L. Taylor It is certified that error appears in the above-identified patent and that said Letters Patent is hereby corrected as shown below:

Title page,
Item [57], ABSTRACT,
Line 13, after "selects one" insert -- the --
Line 21, after "paths, each" delete "the"

Column 2,
Line 42, after "one" insert -- the --
Line 50, after "each" delete "the"
Line 61, delete "an" and insert therefor -- a --

Column 3,
Line 11, after "addition" insert -- , --
Line 14, delete "circuit" and insert therefor -- circuits --
Line 18, after "discussion" delete "." and insert therefor -- , --
Line 32, after "clock" delete "ratio" and insert therefor -- ratios --
Line 63, after "provided" delete "the skew"

Column 4,
Line 34, after "next" delete "clock"
Line 59, after "cycle" delete "and"

Column 5,
Line 11, after "data" delete "path" and insert therefor -- paths --
Line 27, after "each" delete "said"

UNITED STATES PATENT AND TRADEMARK OFFICE
CERTIFICATE OF CORRECTION

PATENT NO. : 5,758,131
DATED : May 26, 1998
INVENTOR(S) : Gary L. Taylor

It is certified that error appears in the above-identified patent and that said Letters Patent is hereby corrected as shown below:

Column 6,
Line 10, after "each" delete "said"
Line 16, after "one" insert -- of --
Line 18, delete "select" and insert therefor -- selected --
Line 24, after "each" delete "said"
Line 31, delete "edges" (first occurrence) and insert therefor -- edge --

Signed and Sealed this

Twenty-sixth Day of November, 2002

Attest:

JAMES E. ROGAN
*Attesting Officer*  *Director of the United States Patent and Trademark Office*